United States Patent
Chen et al.

(10) Patent No.: US 6,564,147 B2
(45) Date of Patent: May 13, 2003

(54) GPS TRAVELING CONTROL SYSTEMS AND THE METHOD OF THE SAME

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

(*) Notice: Subject to any disclaimer, the term of this patent is extended or adjusted under 35 U.S.C. 154(b) by 0 days.

(21) Appl. No.: 09/984,573

(22) Filed: Oct. 30, 2001

(65) Prior Publication Data

US 2003/0023377 A1 Jan. 30, 2003

(30) Foreign Application Priority Data

Jul. 27, 2001 (TW) ........................................ 90118489 A

(51) Int. Cl.⁷ .......................... G06F 17/00; H04B 7/185
(52) U.S. Cl. ..................... 701/213; 701/207; 340/903; 340/905; 340/988; 340/870.09; 342/357.01
(58) Field of Search ................. 701/213, 211, 701/200, 205, 207, 208, 215; 340/996, 870.09, 903, 905, 988, 995; 342/357.01, 457, 357.13

(56) References Cited

U.S. PATENT DOCUMENTS

| | | | | |
|---|---|---|---|---|
| 5,485,161 A | * | 1/1996 | Vaughn | 342/357 |
| 5,854,987 A | * | 12/1998 | Sekine et al. | 701/41 |
| 6,205,399 B1 | * | 3/2001 | Ogino et al. | 701/213 |
| 6,246,948 B1 | * | 6/2001 | Thakker | 701/93 |
| 6,266,614 B1 | * | 7/2001 | Alumbaugh | 701/211 |
| 6,370,475 B1 | * | 4/2002 | Breed et al. | 701/301 |
| 2001/0020202 A1 | * | 9/2001 | Obradovich et al. | 701/1 |

* cited by examiner

*Primary Examiner*—Thomas Black
*Assistant Examiner*—Tuan C To
(74) *Attorney, Agent, or Firm*—Bacon & Thomas, PLLC

(57) ABSTRACT

A GPS traveling control system includes a GPS global positioning device, a memory device, and a microprocessor. The GPS global positioning device receives signals from the global positioning satellites and then derives global positioning data. The memory device stores at least one corresponding control condition and one instruction. The microprocessor determines whether the global positioning data is matched to the control condition, and then controls the corresponding component to execute the corresponding instruction. The present invention can monitor the track of a vehicle automatically, and can automatically control one of the components in the vehicle to execute a corresponding instruction according to a matched control condition.

19 Claims, 9 Drawing Sheets

| SerialNo | UnitID | Longitude | Latitude | Velocity | Altitude | Source | Date |
|---|---|---|---|---|---|---|---|
| 1 | YL000168 | 122.87215405 | 24.25364393 | 58 | 141.78 | 3 | 2001/05/20 AM 08:00:00 |
| 2 | YL000168 | 122.87155932 | 24.25302743 | 53 | 142.92 | 3 | 2001/05/20 AM 08:00:02 |
| 3 | YL000168 | 122.87105569 | 24.25281085 | 63 | 142.98 | 3 | 2001/05/20 AM 08:00:04 |
| 4 | YL000168 | 122.87054748 | 24.25261261 | 63 | 142.17 | 3 | 2001/05/20 AM 08:00:06 |
| 5 | YL000168 | 122.87018422 | 24.25233587 | 57 | 142.86 | 3 | 2001/05/20 AM 08:00:08 |
| 6 | YL000168 | 122.86917582 | 24.25178239 | 64 | 143.24 | 3 | 2001/05/20 AM 08:00:10 |
| 7 | YL000168 | 122.86835591 | 24.25185745 | 78 | 144.86 | 3 | 2001/05/20 AM 08:00:12 |
| 8 | YL000168 | 122.86760248 | 24.25198923 | 66 | 146.75 | 3 | 2001/05/20 AM 08:00:14 |
| 9 | YL000168 | 122.86684732 | 24.25182593 | 73 | 147.56 | 3 | 2001/05/20 AM 08:00:16 |
| 10 | YL000168 | 122.86626748 | 24.25145924 | 71 | 149.71 | 3 | 2001/05/20 AM 08:00:18 |
| 11 | YL000168 | 122.86601767 | 24.25109942 | 73 | 151.31 | 3 | 2001/05/20 AM 08:00:20 |
| 12 | YL000168 | 122.86571057 | 24.25078258 | 70 | 150.29 | 3 | 2001/05/20 AM 08:00:22 |
| 13 | YL000168 | 122.86503734 | 24.25055110 | 74 | 148.77 | 3 | 2001/05/20 AM 08:00:24 |
| 14 | YL000168 | 122.86436756 | 24.25035573 | 69 | 145.26 | 3 | 2001/05/20 AM 08:00:26 |
| 15 | YL000168 | 122.86389601 | 24.25058605 | 61 | 144.62 | 3 | 2001/05/20 AM 08:00:28 |
| 16 | YL000168 | 122.86328753 | 24.25045256 | 63 | 144.70 | 3 | 2001/05/20 AM 08:00:30 |
| 17 | YL000168 | 122.85939256 | 24.24823062 | 68 | 144.25 | 3 | 2001/05/20 AM 08:00:32 |
| 18 | YL000168 | 122.85877893 | 24.24800889 | 63 | 143.88 | 3 | 2001/05/20 AM 08:00:34 |
| 19 | YL000168 | 122.85827759 | 24.24774246 | 66 | 144.18 | 3 | 2001/05/20 AM 08:00:36 |
| 20 | YL000168 | 122.85769088 | 24.24738895 | 62 | 144.46 | 3 | 2001/05/20 AM 08:00:38 |

Fig. 1

| Event | Control condition ||||| Instruction ||||
|---|---|---|---|---|---|---|---|---|---|
| | time / date | longitude / latitude | speed | altitude | ... | head lamp | fog lamp | multimedia system | ... |
| 1. tunnel | ------ | tunnel location | ------ | ------ | ... | actuating head lamps | ------ | ------ | ... |
| 2. city | Pm 5:00 ~ Am 7:00 | city zone | ------ | ------ | ... | actuating head lamps | ------ | ------ | ... |
| 3. foggy zone | Nov. ~ Aug. | foggy zone | ------ | ------ | ... | ------ | actuating fog lamps | ------ | ... |
| 4. landscape | ------ | landscape location | ------ | ------ | ... | ------ | ------ | playing VCD about the landscape | ... |
| 5. licensed store | Am10:00 ~ Pm10:00 Jun. 1 ~ Jun. 15 | store location | ------ | ------ | ... | ------ | ------ | playing promotion advertisement | ... |
| 6. overspeed | ------ | super highway zone | >90 km/hr | ------ | ... | ------ | ------ | playing alert voice of over speed | ... |
| 7. snow zone | ------ | snow zone | ------ | >2000 m | ... | ------ | ------ | playing alert voice of adding chains | ... |
| 8. accident | ------ | accident location | ------ | ------ | ... | ------ | ------ | playing alert voice of changing path | ... |
| .......... | .......... | .......... | .......... | .......... | .......... | .......... | .......... | .......... | .......... |

Fig. 4

| Event | Control condition | | | | | Instruction | | |
|---|---|---|---|---|---|---|---|---|
| | time / date | longitude / latitude | speed | altitude | ... | GSM / hand free system | multimedia system | ... |
| A1 | ------ | L1 | --- | --- | ... | dial to control center and report location / time of the vehicle | ------- | ... |
| A2 | ------ | L2 | --- | --- | ... | dial to control center and report location / time of the vehicle | ------- | ... |
| A3 | ------ | L3 | --- | --- | ... | dial to control center and report location / time of the vehicle | ------- | ... |
| A4 | ------ | L4 | --- | --- | ... | dial to control center and report location / time of the vehicle | ------- | ... |
| A5 | ------ | L5 | --- | --- | ... | ---------- | playing VCD about the landscape | ... |

Fig. 6

| Event | Control condition |||||| Instruction ||
|---|---|---|---|---|---|---|---|---|
| | time / date | longitude / latitude | speed | altitude | ... | head lamps | fog lamps | GSM / hand free system |
| T1 | 2001/07/10 AM08:00 | --- | --- | --- | ... | --- | --- | dial to control center and report location / time of the vehicle |
| T2 | 2001/07/10 AM09:00 | --- | --- | --- | ... | --- | --- | dial to control center and report location / time of the vehicle |
| T3 | 2001/07/10 AM10:00 | --- | --- | --- | ... | --- | --- | dial to control center and report location / time of the vehicle |
| T4 | 2001/07/10 AM11:00 | --- | --- | --- | ... | --- | --- | dial to control center and report location / time of the vehicle |
| T5 | 2001/07/10 AM12:00 | --- | --- | --- | ... | --- | --- | dial to control center and report location / time of the vehicle |
| T6 | 2001/07/10 PM13:00 | --- | --- | --- | ... | --- | --- | dial to control center and report location / time of the vehicle |
| T7 | 2001/07/10 PM14:00 | --- | --- | --- | ... | --- | --- | dial to control center and report location / time of the vehicle |
| ... | ... | ... | ... | ... | ... | ... | ... | ... |
| A9 | --- | L9 | --- | --- | ... | --- | --- | dial to control center and report location / time of the vehicle |

Fig. 8

| Event | Control condition ||||| Instruction ||
|---|---|---|---|---|---|---|---|
| | time / date | longitude / latitude | speed | altitude | ... | GSM / hand free system | multimedia system |
| A1 | --- | L1 | --- | --- | ... | dial to control center and report location / time | ... |
| A2 | --- | L2 | --- | --- | ... | dial to control center and report location / time | ... |
| A6 | --- | L6 | --- | --- | ... | dial to control center and report location / time | ... |
| A7 | --- | L7 | --- | --- | ... | dial to control center and report location / time | ... |
| A4 | --- | L4 | --- | --- | ... | dial to control center and report location / time | ... |
| A5 | --- | L5 | --- | --- | ... | --- | playing VCD about the landscape |

Fig. 9

GPS TRAVELING CONTROL SYSTEMS AND THE METHOD OF THE SAME

BACKGROUND OF THE INVENTION

1. Field of the Invention

The present invention relates to a traveling control system and the method of the same, and especially to a GPS traveling control system and the method of the same, suitable to be used in a moving vehicle with a GPS global positioning system for automatically controlling the operation of the components of the vehicle.

2. Description of Related Art

The vehicles with a prior GPS global positioning system receive signals from global positioning satellites per unit time (for example, one, two, or five seconds) and then calculate the longitude/latitude, velocity, altitude, etc. of the vehicle.

The vehicles with a prior GPS global positioning system also record the number of the global positioning satellites, time/date, unit ID, etc. of the vehicle to be as a GPS global positioning data so as to form a GPS traveling recorder (FIG. 1).

In the prior art, information is provided to drivers by, for example, displaying electronic maps in a liquid crystal display, or dialing a GSM/hand free system or linking to an information provider so as to request information, such as traveling paths, stock prices, and other services.

The plurality of GPS global positioning data stored in the prior art GPS traveling recorder may only be used for record purposes. The data therein cannot be used in real-time. It is analyzed only after the vehicle is back to a base. The driver must check the GPS global positioning system manually for acquiring data. Furthermore, the components in a vehicle are controlled by the driver himself (or herself). The system has no ability of monitoring traveling information automatically, reporting the location and time of the vehicle, and controlling the components of the vehicle automatically. If a control center wants to track the vehicle actively, in the prior system the data is transferred periodically by the driver manually. If the time interval is short, the reporting cost is high, while if the interval is long, the timing cannot be captured accurately. Thus, the prior art is not an ideal design.

Therefore, it is desirable to provide an improved traveling control system to mitigate and/or obviate the aforementioned problems.

SUMMARY OF THE INVENTION

Accordingly, the primary object of the present invention is to provide a GPS traveling control system and the method of the same for monitoring a vehicle moving information so as to control the components in the vehicle automatically.

Another object of the present invention is to provide a GPS traveling control system and the method of the same, wherein the system further comprises an input device for inputting data through wired or wireless transmission to change the control condition and/or instruction. Therefore, the components of a vehicle can be controlled flexibly.

A further object of the present invention is to provide a GPS traveling control system and the method of the same, wherein the track of the vehicle can be automatically reported to a control center so as to monitor the vehicle at any time.

To achieve the objects, the present invention provides a OPS traveling control system. The GPS traveling control system mainly includes a GPS global positioning device, a memory device, and a microprocessor. The GPS traveling control system is utilized in a moving vehicle for receiving signals from global positioning satellites and for automatically controlling the operation of at least one component in the vehicle. The GPS global positioning device serves for receiving signals from the global positioning satellites and then deriving global positioning data about longitude and latitude, date, and/or speed, and altitude of the vehicle. The memory device stores at least one control condition and at least one instruction corresponding to each control condition. The control condition defines a judgement condition to determine whether the corresponding instruction is to be executed; and the control condition contains at least one control parameter. The microprocessor is used for comparing the global positioning data from the GPS global positioning device with the control condition in the memory device, and determining whether the global positioning data is matched to the control condition If yes, the corresponding vehicle component is controlled to execute the corresponding instruction. Therefore, the present invention can monitor the vehicle moving information so as to control the corresponding component automatically.

The component of the vehicle according to the present invention is selected from any electronic device, such as head lamps, fog lamps, an audio device, a video device, radio, stereo, or other multimedia devices, GSM/hand free system, air conditioner, buzzer, warning lamp, or any other equivalent audio/video warning devices. The present invention can define a specific location, or a specific time/date in the control condition to activate a GSM/hand free system automatically reporting the location of the vehicle to a control center, so as to monitor the vehicle at any time.

Each control condition may include at least one of the following parameters, and Boolean logic operations thereof:
  (a) Time/date parameter: defining a specific time/date, or a time interval for executing the corresponding instructions;
  (b) Longitude/latitude parameter: defining a location having a specific longitude/latitude, or a geometric zone for executing the corresponding instruction;
  (c) Speed parameter: defining a specific speed, or a speed range for executing the corresponding instruction; and
  (d) Altitude parameter: defining a specific altitude, or an altitude range for executing the corresponding instruction.

The present invention further comprises an input device for inputting data through wired or wireless transmission to change the control condition and/or instruction. Therefore, the components of a vehicle can be controlled flexibly.

The present invention provides a GPS traveling control method comprising the following steps:
  receiving signals from the global positioning satellites and then deriving global positioning data about longitude and latitude, date, and/or speed, and altitude of the vehicle;
  comparing the global positioning data with the control condition, and determining whether the global positioning data is matched to the control condition;
  reading the instruction corresponding to the control condition if the global positioning data matches the control condition; and
  controlling the corresponding vehicle component to execute the corresponding instruction.

The GPS vehicle traveling control method may be programmed for execution. The program can be stored in any recording medium identified and read by a microprocessor or any object without being confined by any form. For example, the recording medium may be an IC chip, a CD, a CD-R, an MO, a hard disk, or a floppy disk, the object may contain any recording medium used by those skilled in the art. Preferably, the object is a random access memory (RAM) updated easily.

Other objects, advantages, and novel features of the invention will become more apparent from the following detailed description when taken in conjunction with the accompanying drawings.

BRIEF DESCRIPTION OF THE DRAWINGS

FIG. 1 shows the data contents recorded in a prior GPS traveling recorder.

FIG. 4 shows the plurality of control conditions and corresponding instructions stored in the memory device of the present invention.

FIG. 6 shows the schedule file of the preferred embodiment of the present invention stored in the memory device.

FIG. 8 shows another schedule file of the preferred embodiment of the present invention stored in a memory device.

FIG. 9 shows a schedule file updated from FIG. 6.

DETAILED DESCRIPTION OF THE PREFERRED EMBODIMENT

Figure 2:
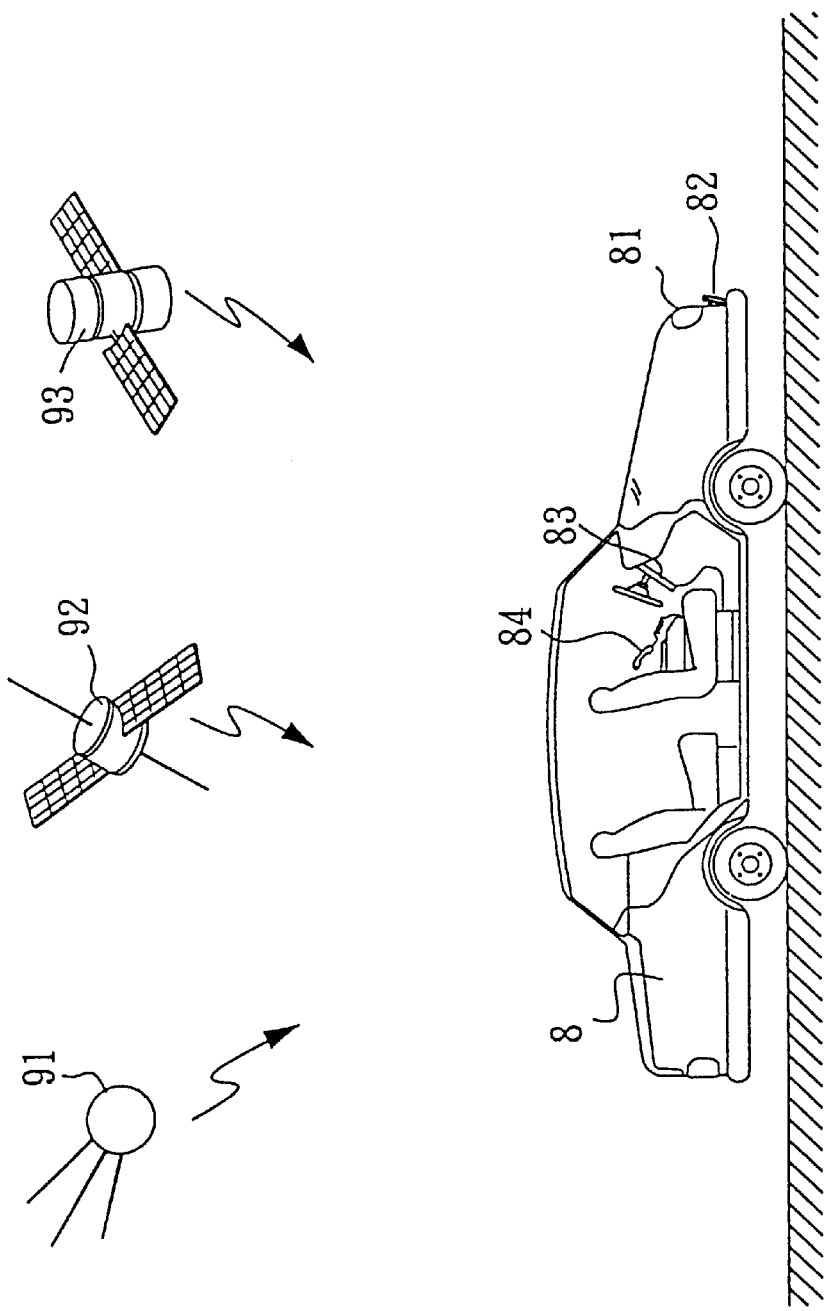
FIG. 2 shows a schematic view of the preferred embodiment of the present invention.
Figure 3:
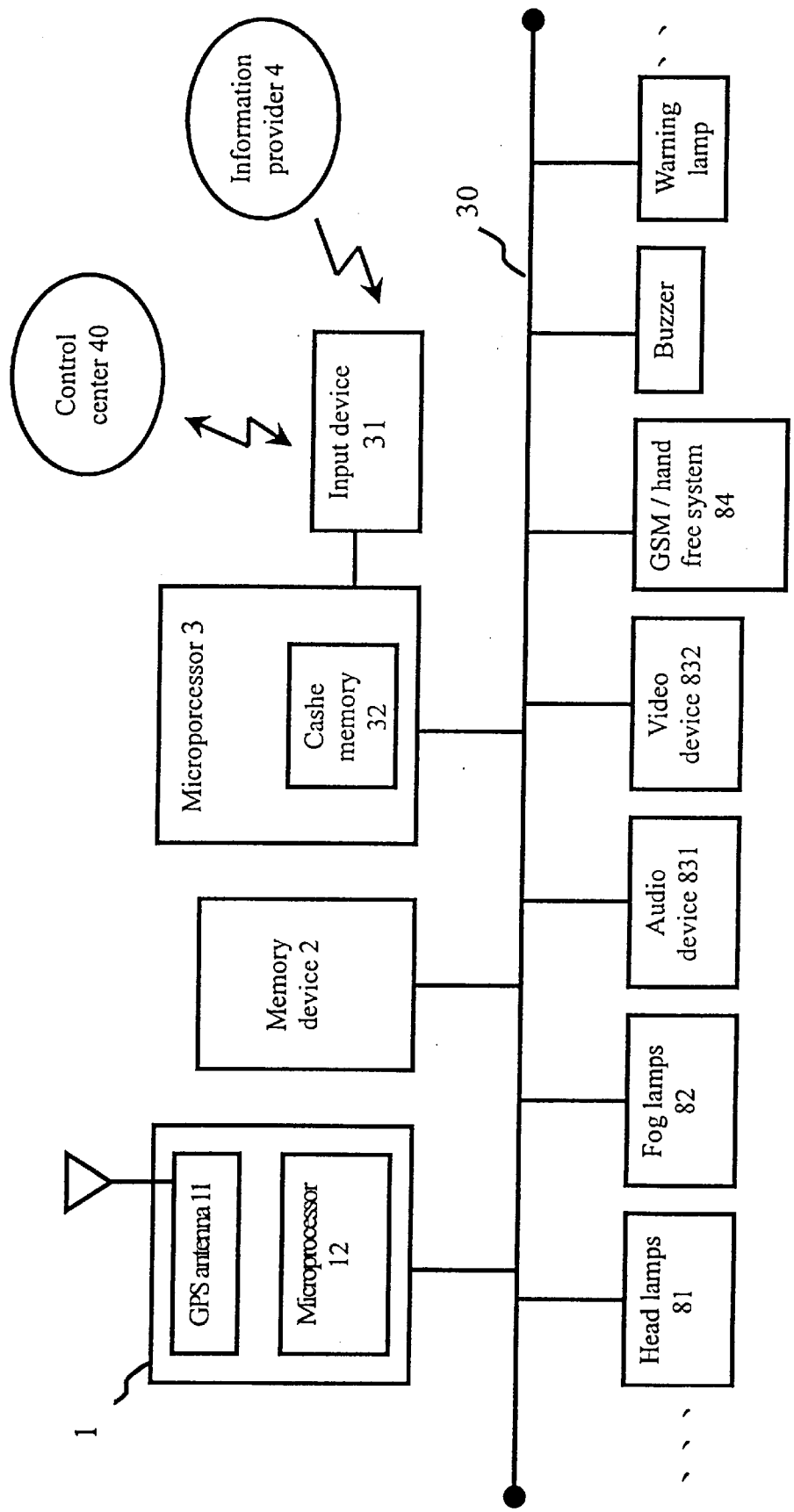
FIG. 3 shows the functional block diagram of the preferred embodiment of the present invention.

Referring to FIG. 2 and FIG. 3, the GPS traveling control system of the present invention is illustrated. The GPS traveling control system is installed in a passenger vehicle 8 (or other kinds of vehicles, such as commercial car, trunk, train . . . etc.). The vehicle 8 has head lamps 81, fog lamps 82, or an audio device 831, a video device 832, and other multimedia systems 83, or a GSM/hand free system 84, etc.

With reference to FIG. 3, the above components are connected to a microprocessor 3 through a bus 30. Furthermore, a GPS global positioning device 1 and a memory device 2 are connected to the bus 30, respectively.

In this embodiment, the memory device 2 may be a memory card reader (not shown) for reading the content of a memory card. FIG. 4 shows that a plurality of events and corresponding control conditions, and instructions are stored in the memory card. Each event means that when the control condition is matched, a respective component (head lamps 81, fog lamps 82, an audio device 831, a video device 832, or other multimedia systems 83, etc, or GSM/hand free system 84) is controlled for executing the respective instruction. It should be noted that the control condition of each event may include one or more control parameter (time/date, longitude and latitude, speed, altitude, etc.). Of course, it may contain Boolean logic operations therebetween. The details will be described in the following.

Figure 5:
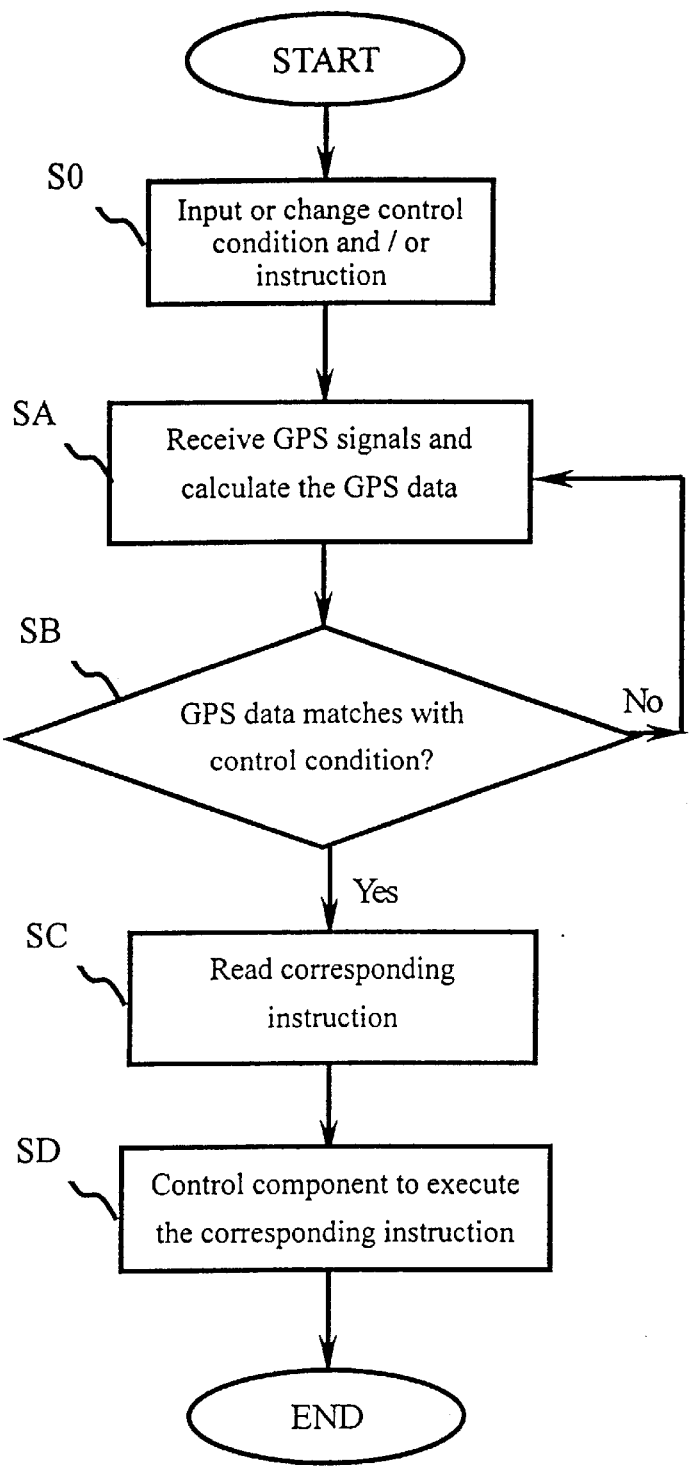
FIG. 5 shows a flow diagram of the preferred embodiment of the present invention.

Referring to FIG. 5, the flow diagram of this embodiment is illustrated. At first, in step SA, the GPS global positioning device 1 receives signals from three global positioning satellites 91, 92, and 93 through the GPS antenna 11 (referring to FIG. 2). Then, the microprocessor 12 calculates the global positioning data of the vehicle 8 at that time, which includes time/date, longitude and latitude, speed, altitude, etc. In step SB, the microprocessor 3 compares the calculated global positioning data with the control conditions in the memory device 2 and determines whether they are matched? In step SC, when the global positioning data matches one of the conditions, then the microprocessor 3 reads the corresponding instruction of the matched condition. In step SD, the corresponding component in the vehicle is instructed to execute the corresponding instruction.

Therefore with the abovesaid description, each event in FIG. 4 can be understood easily as below:

Event 1: when vehicle 8 enters into a specific location of a tunnel, the microprocessor 3 may actuate the head lamps 81 automatically for illuminating the tunnel.

Event 2: when the vehicle 8 accesses a specific zone of a city, at a specific time interval, for example, from PM 5:00 to AM 7:00, the head lamps 81 can be actuated automatically to light the road. It should be noted that the specific zone and time interval are assembled by Boolean logic operation "AND".

Event 3: when the vehicle 8 enters into a zone which is easily covered by fog in a specific time interval, and the geometric boundary of the foggy zone is defined in the control condition, the microprocessor 3 can actuate the fog lamps 82.

Event 4: when the vehicle 8 enters into a landscape location, the microprocessor 3 will actuate the audio device 831, video device 832 or other multimedia system, etc. automatically for playing the introduction about the landscape.

Event 5: when the vehicle 8 enters into a specific location of a licensed store or department store in a specific time interval, for example the time interval for promotion, the microprocessor 3 may actuate the audio device 831, video device 832 or other multimedia system, etc. automatically for playing the promotion advertisement of products.

Event 6: when the vehicle 8 is driven in a specific zone of a super highway, and the vehicle speed is larger than 90 km/h, the microprocessor 3 may actuate the audio device 831 for playing an alert voice of over speed.

Event 7: when the vehicle 8 enters into a specific zone of a snow region and has a height over 2000 m, the microprocessor 3 may actuate the audio device 831 automatically to inform the user an alert voice to add chains to the wheels. In this embodiment, it is preferred that signals of four satellites are received.

Event 8: when the vehicle 8 enters into a specific location of an accident, the microprocessor 3 may actuate the audio device 831 to play an alert voice to change the traveling path.

Other vehicle components, such as GSM/hand free system 84, buzzer, warning lamps, or other audio and video alarm device, or radio, stereo may be actuated according to the required condition. Those skilled in the art may execute these actions according to the above embodiment, and thus the details will not be further described.

Therefore, in the present invention, a moving vehicle may utilize the global positioning data of date, longitude and latitude, speed, altitude, etc. for monitoring the vehicle itself at any time, and for controlling the components in the vehicle to be automatically actuated according to the preset conditions. Therefore, the present invention is more novel than the prior art.

FIG. 3 shows an input device 31, which can be used in step SO, i.e., it is used to input or change the control condition and/or instruction in advance. Thereby, these data may be stored in the memory device 2 through the microprocessor 3 for being used in the next time for monitoring the traveling information. Therefore, the components of the vehicle can be controlled flexibly.

The simplest form of the input device 31 is a keyboard which is wired-connected, or other wirelessly connected devices (such as through GSM wireless communication network, wireless pager network, or other wireless transmission way) for receiving the revised control conditions or instructions wirelessly from a control center 40. Thereby, the data in the memory device 2 can be updated. The wireless transmission is especially used in the field that the control condition must be changed frequently. For example, in above events 3 and 7, it is preferred that the actual situation of foggy zone or snowing zone from the climate report center can be updated by wireless communication. In above event 8, the data about the traffic accident from the traffic control center and voice data for changing traveling path can be updated wirelessly any time. The voice or video content of any event may be stored in the memory device 2, or a further memory with a larger capacity can be installed. For example, it is prerecorded in a compact disk for displaying to the driver. Preferably, in above event 5, an information provider 4 updates the video contents through a larger bandwidth wirelessly.

Figure 7:
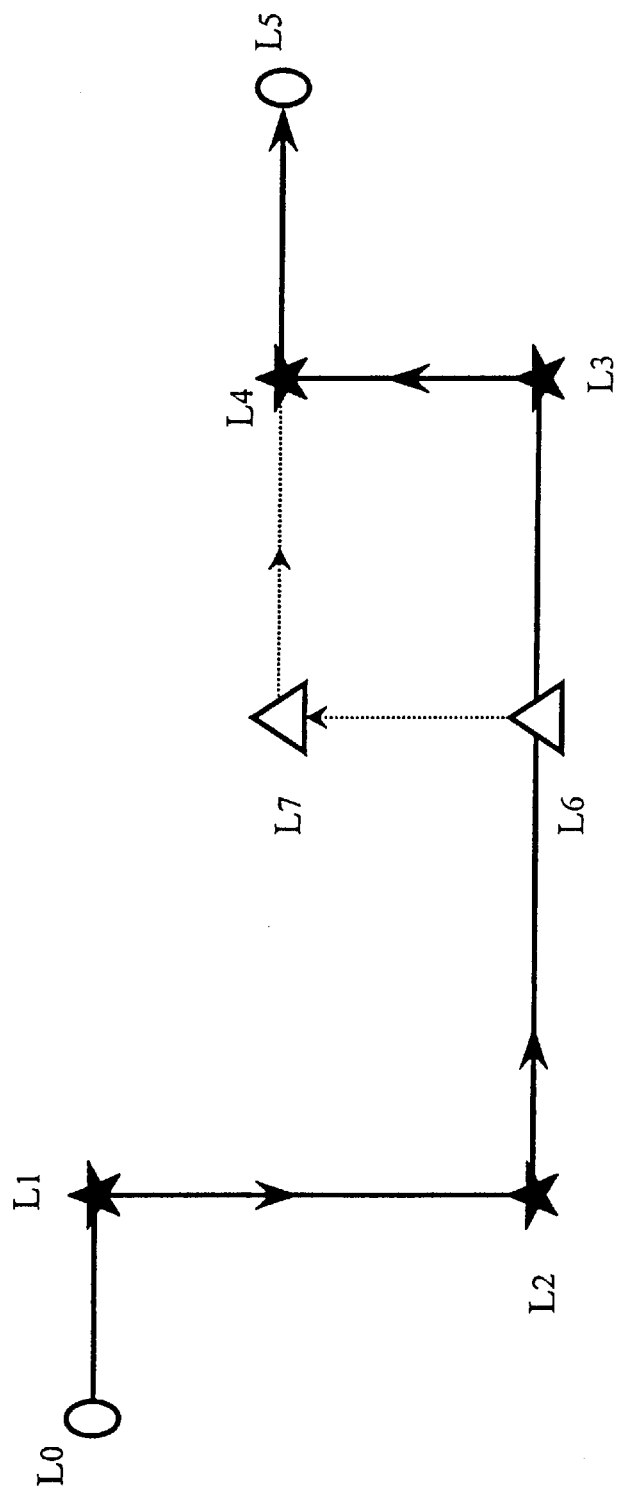
FIG. 7 shows a schematic view of the path of the schedule file in FIG. 6.

In the application of the present invention, a plurality of control conditions and the corresponding instructions can be arranged in a schedule file and then are stored in the memory device 2. FIG. 6 shows a schedule file for tour traveling prerecorded in the memory device 2, wherein a plurality of events A1~A5 are recorded, which shows the optimum path from the start point L0 to object L5 (referring to FIG. 7). When vehicle 8 moves to the specific location L1, L2, L3 or L4, it may execute respective instruction automatically for dialing the GSM/hand free system 84 to the control center 40 for reporting the location/time of the vehicle at that time. Therefore, the control center 40 may completely monitor and track the path of the vehicle. When the vehicle 8 accesses the object location L5, the microprocessor 3 executes the instruction for actuating the multimedia system to play the VCD compact disk video of the introduction of landscape. It has a preferred tour guide effect.

Another schedule file is illustrated in FIG. 8, wherein a plurality of events T1 to A9 are recorded. In that the control condition is defined every one hour, or when the vehicle arrives to the object L9, the corresponding instructions are all executed automatically for dialing the GSM/hand free system 84 to report the location/time to the control center 40. Thereby, the control center 40 may completely know the trace of the vehicle. This function is especially suitable for vehicles which must be tracked, such as oil tank vehicles, refrigerator trucks, transferring vehicles of linking supermarket, etc.

The two schedules illustrated in FIGS. 6 and 8 are arranged at a specific location or a specific time, wherein the corresponding instructions are executed automatically for dialing the GSM/hand free system 84 to report the location/time to the control center 40. However, as the vehicle is driven in a large area, such as big country of U.S.A. or China, the service telephone numbers of the control centers are not the same in every state. Therefore, a setting condition may be used, wherein as the vehicle 8 enters into a specific area, the vehicle 8 may capture automatically the service telephone number of the new control center from the old one. And then, the GSM/hand free system 84 is dialed to report the location/time to the new control center.

Since in the present invention, the vehicle can be tracked at any time by defining the report condition, the control center 40 may actively provide the real-time service to the vehicle driver. For example, if a traffic accident occurs in L3, the control center 40 may notice the vehicle driver immediately through the GSM/hand free system to change the path, and then a new schedule (referring to FIG. 9) file is downloaded through the GSM wireless network for replacing the old one (referring to FIG. 6). Then the new schedule file is stored in the memory device 2 for tracking continuously. It should be noted that L3 has been cancelled in FIG. 9, and another two new reporting locations L6 and L7 are added for detouring around the location L3.

Another, when the vehicle owner requests the control center 40 to provide the nearest repairing centers, oil stations, restaurants, or other specific locations. The control center 40 may download a new schedule file through the GSM wireless network and stores the file in the memory device 2 for tracking continuously. When the vehicle moves near the specific location, for example, a repairing center, about a pre-determined distance (for example, 300 to 500 m), the control center 40 may actively inform the repairing center the repairing requirement of the vehicle. Thereby, the repairing center may prepare in advance to receive the guest.

The abovesaid schedule file may be wirelessly downloaded by the control center 40 automatically for updating the contents in the memory device 2. Of course, it can be input manually by the vehicle owner. For example, the preferred contents in a schedule file may be inputted from a keyboard by the vehicle owner. Alternatively, the control center 40 may offer a web site server for vehicle owner to set his own schedule file in Internet. Then, the file is downloaded through GSM wireless network from the control center 40 to the memory device 2 of the vehicle to be used next time.

In the present invention, the GPS vehicle traveling control method may be programmed for execution. The program can be stored in any recording medium identified and read by a microprocessor, or any object contains the recording medium without being confined by any form. Preferably, the recording medium is a random access memory (RAM), the cashe memory 32 in FIG. 3, an IC chip, a CD, a CD-R, an MO, a hard disk, a floppy disk, or other object containing the recording medium used by those skilled in the art. Since the method of the present invention has been disclosed completely, and those skilled in the art may write the software program from above description. Thus, the details about writing the program will not be further described herein.

Although the present invention has been explained in relation to its preferred embodiment, it is to be understood that many other possible modifications and variations can be made without departing from the spirit and scope of the invention as hereinafter claimed.

What is claimed is:

1. A GPS traveling control system utilized in a moving vehicle for receiving signals from global positioning satellites and for automatically controlling the operation of a plurality of different vehicle components in the vehicle, the GPS traveling control system comprising:

a GPS global positioning device for receiving signals from the global positioning satellites and then deriving global positioning data about longitude/latitude, time/date, speed, or altitude of a vehicle;

a memory device storing a plurality of control conditions relating to control of said different vehicle components and at least one instruction corresponding to each control condition; each control condition defining a judgement condition to determine whether the corresponding instruction is to be executed; and each control condition containing at least one control parameter; and a microprocessor for comparing the global positioning data from the GPS global positioning device with each of the control conditions in the memory device, determining whether the global positioning data is matched to at least one corresponding control condition and, if yes, controlling each vehicle component to which a corresponding control condition is matched by executing the at least one corresponding instruction.

2. The GPS traveling control system as claimed in claim 1, wherein the plurality of different components of the vehicle are selected from the group consisting of head lamps, fog lamps, an audio device, a video device, a multimedia system, and a GSM/hand free system.

3. The GPS traveling control system as claimed in claim 1, wherein each control condition includes at least one of the following control parameters:

(a) time/date parameter: defining a specific time/date, or a time interval for executing the corresponding instruction;

(b) longitude/latitude parameter: defining a location having a specific longitude/latitude, or a geometric zone for executing the corresponding instruction;

(c) speed parameter: defining a specific speed, or a speed range for executing the corresponding instruction; and (d) altitude parameter: defining a specific altitude, or an altitude range for executing the corresponding instruction.

4. The GPS traveling control system as claimed in claim 1, wherein each control condition includes at least two control parameters and Boolean logic operations thereof.

5. The GPS traveling control system as claimed in claim 1, further comprising an input device for inputting data through wired transmission to change one of the control conditions or instructions.

6. The GPS traveling control system as claimed in claim 1, further comprising an input device for inputting data through wireless transmission to change one of the control conditions or instructions.

7. The GPS traveling control system as claimed in claim 6, wherein the wireless transmission is GSM wireless communication net transmission.

8. A GPS traveling control method utilized in a GPS traveling control system of a moving vehicle for receiving signals from global positioning satellites and for automatically controlling the operation of a plurality of different vehicle components in the vehicle; the GPS traveling control system storing a plurality of control conditions relating to control of said different vehicle components and at least one instruction corresponding to each control condition; each control condition defining a judge judgement condition to determine whether the corresponding instruction is to be executed; and each control condition containing at least one control parameter; the GPS traveling control method comprising the steps of:

receiving signals from the global positioning satellites and then deriving current global positioning data about longitude/latitude, time/date, speed, or altitude of the vehicle;

comparing the current global positioning data with each of said plurality of control conditions corresponding to said plurality of vehicle components to be controlled, and determining whether the global positioning data is matched to at least one of said one of said plurality of control conditions;

for each control condition that matches the current global positioning data, reading the at least one instruction corresponding to the matching one of the plurality of control conditions; and controlling the corresponding vehicle component to execute the corresponding at least one instruction.

9. The GPS traveling control method as claimed in claim 8, wherein the plurality of different components of the vehicle are selected from the group consisting of head lamps, fog lamps, an audio device, a video device, a multimedia system, and a GSM/hand free system.

10. The GPS traveling control method as claimed in claim 8, wherein each control condition includes at least one of the following control parameters:

(a) time/date parameter: defining a specific time/date, or a time interval for executing the corresponding instruction;

(b) longitude/latitude parameter: defining a location having a specific longitude/latitude, or a geometric zone for executing the corresponding instruction;

(c) speed parameter: defining a specific speed, or a speed range for executing the corresponding instruction; and (d) altitude parameter: defining a specific altitude, or an altitude range for executing the corresponding instruction.

11. The GPS traveling control method as claimed in claim 8, wherein each control condition includes at least two control parameters and Boolean logic operations thereof.

12. The GPS traveling control method as claimed in claim 8, further comprising the step of inputting data to change one of the control conditions or instructions.

13. The GPS traveling control method as claimed in claim 12, wherein the step of inputting data includes the step of receiving data from GSM wireless communication net transmission.

14. A computer readable recording medium utilized in a GPS traveling control system of a moving vehicle for receiving signals from global positioning satellites and for automatically controlling the operation of a plurality of different vehicle components in the vehicle; the GPS traveling control system storing a plurality of control conditions relating to control of said different vehicle components and at least one instruction corresponding to each control condition; each control condition defining a judge judgement condition to determine whether the corresponding instruction is to be executed; and each control condition containing at least one control parameter; the recording medium recording a software program for automatically controlling the operation of said plurality of vehicle components in the vehicle in response to GPS global positioning data calculated from signals of GPS global positioning satellites; the software program comprising:

first program means for receiving signals from the global positioning satellites and then deriving current global positioning data about longitude/latitude, time/date, speed, or altitude of the vehicle;

second program means for comparing the current global positioning data with each of said plurality of control conditions corresponding to said plurality of vehicle components to be controlled, and determining whether the current global positioning data is matched to at least one of said one of said plurality of control conditions;

third program means for reading the at least one instruction corresponding to each of the plurality of control conditions that matches the current global positioning data; and fourth program means for controlling the corresponding vehicle component to execute the corresponding at least one instruction.

15. The computer readable recording medium as claimed in claim 14, wherein the plurality of different components of the vehicle are selected from the group consisting of head lamps, fog lamps, an audio device, a video device, a multimedia system, and a GSM/hand free system.

16. The computer readable recording medium as claimed in claim 14, wherein each control condition includes at least one of the following control parameters:
 (a) time/date parameter: defining a specific time/date, or a time interval for executing the corresponding instruction;
 (b) longitude/latitude parameter: defining a location having a specific longitude/latitude, or a geometric zone for executing the corresponding instruction;
 (c) speed parameter: defining a specific speed, or a speed range for executing the corresponding instruction; and
 (d) altitude parameter: defining a specific altitude, or an altitude range for executing the corresponding instruction.

17. The computer readable recording medium as claimed in claim 14, wherein each control condition includes at least two control parameters and Boolean logic operations thereof.

18. The computer readable recording medium as claimed in claim 14, further comprising a fifth program means for inputting data to change one of the control conditions or instructions.

19. The computer readable recording medium as claimed in claim 18, wherein the fifth program means receives data from GSM wireless communication net transmission.

* * * * *